2 Sheets, Sheet 1.

W. Crawford,
Excavator.

No. 93,419. Patented Aug. 10, 1869.

WITNESSES
O. Hinchman
Mo K Brooks

INVENTOR
W Crawford
pr Wmm
Attorneys

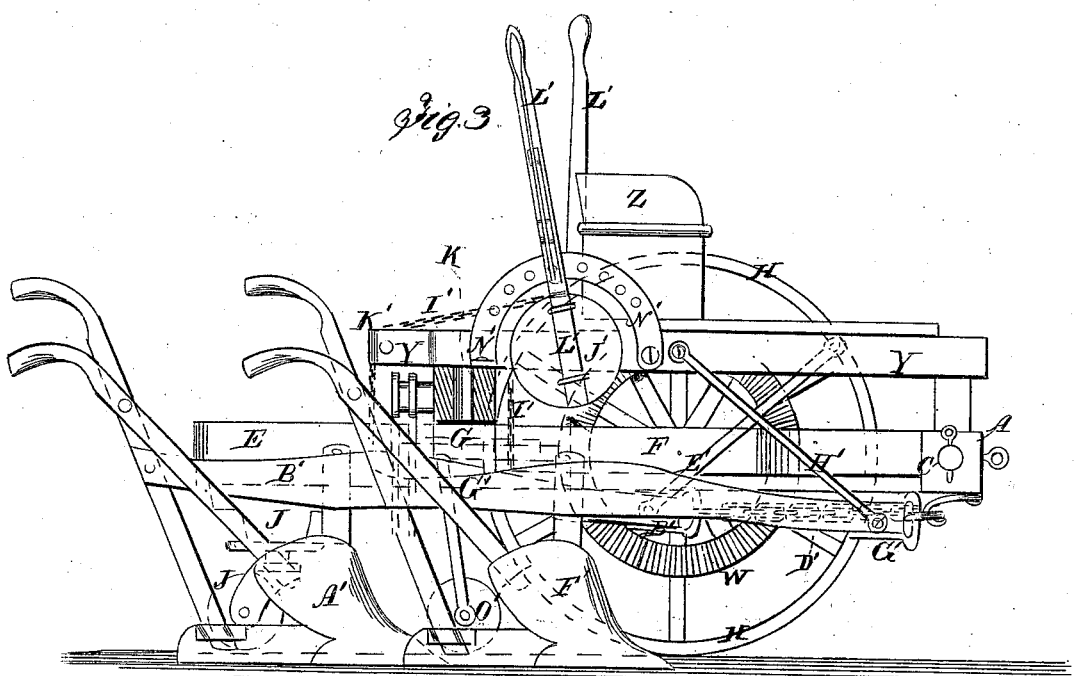

United States Patent Office.

WILSON CRAWFORD, OF STREATOR, ILLINOIS.

Letters Patent No. 93,419, dated August 10, 1869.

IMPROVED DITCHING-MACHINE.

The Schedule referred to in these Letters Patent and making part of the same.

*To all whom it may concern:*

Be it known that I, WILSON CRAWFORD, of Streator, in the county of La Salle, and State of Illinois, have invented a new and improved Ditching-Machine; and I do hereby declare that the following is a full, clear, and exact description thereof, which will enable others skilled in the art to make and use the same, reference being had to the accompanying drawing, forming part of this specification, in which—

Figure 3 is a side view of the same, the elevator-frame being detached; also one of the wheels removed and an extra plow provided, whereby the machine is adapted to perform the office of a gang-plow.

Similar letters of reference indicate corresponding parts.

My invention has for its object to furnish a simple and convenient ditching-machine, which shall be so constructed and arranged that the elevator may be removed, an extra plow attached, and other minor changes readily made for adapting the same to perform substantially the office of a gang-plow when required, the several parts comprising the machine being combined and arranged all as hereinafter more fully described.

A is the front cross-bar of the frame, to the forward side of which the tongue B, by means of which the machine is drawn and guided, is attached.

Upon one end of the cross-bar A is formed, or to it is attached an axle, C, to receive the wheel D.

To the other end of the bar A is securely attached the forward end of the longitudinal bar E.

F is a longitudinal bar, the forward end of which is securely attached to the front cross-bar A, and the rear end of which is securely connected with the rear part of the longitudinal bar E, by the short cross-bar G.

H is the drive-wheel, which is rigidly attached to the axle, or shaft N, the journals of which revolve in bearings attached to the longitudinal bars E and F.

Figure 1:
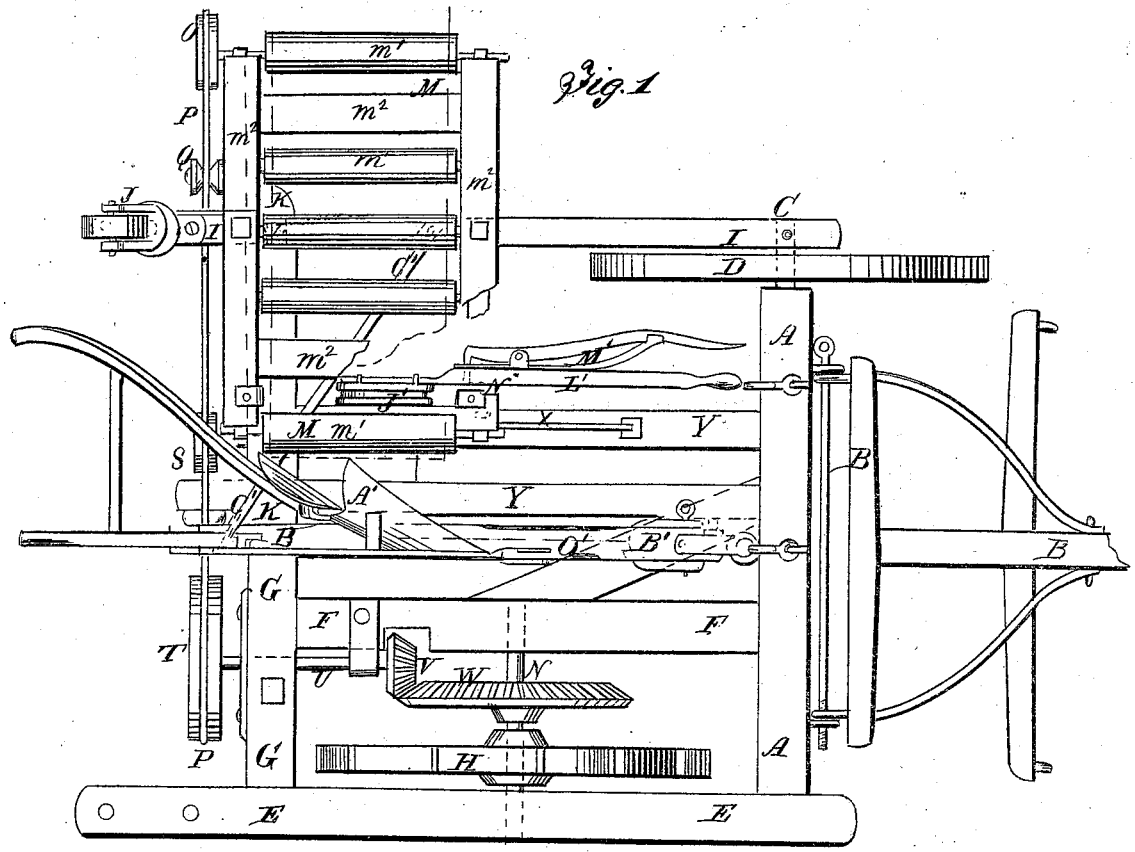
Figure 1 is an under-side view of my improved machine, part being broken away to show the construction.

I is a detachable longitudinal bar, the forward end of which is placed upon the projecting end of the axle C, to which it is detachably secured by a pin, as shown in fig. 1.

Figure 2:
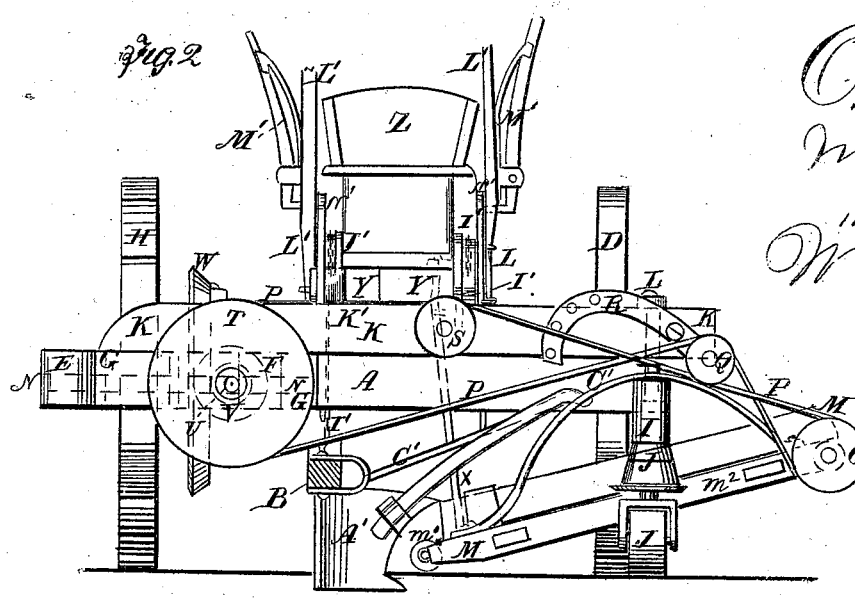
Figure 2 is a rear-end view of the same.

The rear end of the longitudinal bar I is supported by the caster-wheel J, which is detachably attached to said bar, as shown in figs. 1 and 2.

K is the rear cross-bar, one end of which is attached to the upper side of the short cross-bar G, and its other end is detachably attached to the detachable longitudinal bar I, by the bolt L, as shown in fig. 2.

M is the dirt-elevator, consisting of a series of rollers, $m^1$, pivoted to a frame-work, $m^2$, which is hung from and rigidly connected with the bar I, in an inclined position, so as to receive the dirt from the plow, and raise it to the side of the ditch.

The elevator M should be provided with an endless apron, passing around the rollers $m^1$, to receive and carry up the dirt, as shown in red in fig. 1.

To the projecting end of the journal of the upper roller $m^1$ is attached a pulley, O, around which passes the band P.

The band P passes over the guide and tension-pulley Q, pivoted to the arm R, which is pivoted to the rear cross-bar K, and is secured in position, when adjusted, by a pin passing through one or the other of the holes in the said arm R, and into a hole in the said bar K.

The band P passes over the guide-pulley S, pivoted to the bar K, and around the drive-pulley T, attached to the rear end of the shaft U, which revolves in bearings attached to the bars G and F, and to the forward end of which is attached the bevel-gear wheel V.

The teeth of the bevel-gear wheel V mesh into the teeth of the large bevel-gear wheel W, attached to the drive-wheel shaft N, so that the elevator may be operated by the advance of the machine.

The lower forward corner of the elevator M is further supported by the rod X, the lower end of which is secured to said elevator, and the upper end of which has a screw-thread cut upon it, passes up through the frame Y, to which the driver's seat Z is attached, and is secured to said frame by nuts, placed, the one above and the other below the said frame Y.

A' is the plow, by which the dirt is loosened and thrown upon the elevator M, the forward end of the beam B' of which is connected with the front cross-bar A, by means of a clevis, ring, or link and hook, as shown in figs. 1 and 2.

The rear part of the plow is steadied and held in position by a bar, or rod, C', the rear end of which is attached to the rear part of the plow-beam B', and its other end is detachably secured to the bar I, as shown in figs. 1 and 2.

When the machine is to be used as a gang-plow, the caster-wheel J is detached from the rear end of the bar I, and attached to the rear end of the bar E, and the bar I, and the elevator M attached to it, are removed from the machine, the rod C' being detached from the bar I.

A short chain, D', is interposed between the clevis and hook, by means of which the beam B' is connected to the front cross-bar A, allowing the plow A' to drop back into the position shown in fig. 3.

The plow A' is steadied in this position by the rod, or bar E', one end of which is attached to the forward part of the plow-beam B', and the other end of which is secured to the seat-frame Y.

F' is an extra plow, the forward end of the beam G'

*Assignor to himself & John C. Muladore of the same place.* of which is connected to the front cross-bar A, by means of a clevis-ring or link and hook, as shown in fig. 3.

The plow F' G' is steadied by the rod, or bar H', one end of which is attached to the forward part of the beam G', and the other end of which is secured to the seat-frame Y, as shown in fig. 3.

I' are chains, the lower ends of which are attached to the rear parts of the plow-beams B' and G', and the upper ends of which are attached to the wheels J'.

In the case of the plow A' B', when the chain D' is used, the chain I' should be carried back over the guide-pulley K', pivoted to the rear end of the seat-frame Y, so as to bring the said chain into proper position to raise the said plow.

The wheels J' are pivoted to the opposite sides of the seat-frame Y, and to them are attached the lower ends of the levers L', the upper ends of which extend up into such a position that they may be conveniently reached and operated by the driver from his seat.

M' is a spring-lever catch, attached to the lever L', which enters one or the other of the holes in the curved bars N', to hold the plows elevated to any desired distance. One or both the plows may be provided with a revolving cutter, O', if desired.

Having thus described my invention,

What I claim as new, and desire to secure by Letters Patent, is—

1. The combination and arrangement of the front cross-bar A, longitudinal bars E F, short cross-bar G, rear cross-bar K, and wheels D and H, with each other, substantially as herein shown and described, and for the purpose set forth.

2. The combination of the detachable longitudinal bar I and elevator M with the axle C, of the wheel D, and with the frame K G E F A, substantially as herein shown and described, and for the purpose set forth.

3. The combination of the band P, pulley O, guide and tension-pulley Q R, guide-pulley S, drive-pulley T, shaft U, and bevel-gear wheels V W, with each other, with the shaft N, of the drive-wheel H, and with the elevator M, substantially as herein shown and described, and for the purpose set forth.

4. The combination of the plow A' B' and bar, or rod C', with the front cross-bar A, detachable longitudinal bar I, and elevator M, substantially as herein shown and described, and for the purpose set forth.

5. The combination of the plows A' B' and F' G', and rods or bars E' and H', with each other, and with the front cross-bar A and seat-frame Y, substantially as herein shown and described, and for the purpose set forth.

6. The combination of the levers L', lever-spring catches M', curved catch-bars N', and chains I', with each other, with the seat-frame Y, and with the plows A' B' and F' G', whether one or both of said plows are used, substantially as herein shown and described, and for the purpose set forth.

The above specification of my invention signed by me, this 24th day of April, 1869.

WILSON CRAWFORD.

Witnesses:
JOSIAH ONEIL,
T. W. TIMMONS.